(12) United States Patent
Köster

(10) Patent No.: US 7,397,394 B2
(45) Date of Patent: Jul. 8, 2008

(54) PROCESS TO DETERMINE THE ABSOLUTE ANGULAR POSITION OF A MOTOR VEHICLE STEERING WHEEL

(75) Inventor: Michael Köster, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 187 days.

(21) Appl. No.: 11/481,505

(22) Filed: Jul. 6, 2006

(65) Prior Publication Data

US 2007/0030545 A1 Feb. 8, 2007

(30) Foreign Application Priority Data

Jul. 14, 2005 (DE) .................. 10 2005 032 870

(51) Int. Cl.
*H03M 1/22* (2006.01)
(52) U.S. Cl. .......................... 341/13; 341/11
(58) Field of Classification Search ............... 341/1–17
See application file for complete search history.

(56) References Cited

U.S. PATENT DOCUMENTS

| 4,572,952 | A | * | 2/1986 | March .................. 250/237 G |
| 4,631,519 | A | | 12/1986 | Johnston |
| 5,239,297 | A | * | 8/1993 | Kley ........................ 341/13 |
| 5,802,206 | A | | 9/1998 | Marold |
| 6,304,190 | B1 | | 10/2001 | Blasing |
| 6,459,389 | B1 | | 10/2002 | Germuth-Loffler et al. |
| 6,867,412 | B2 | * | 3/2005 | Patzwald et al. ....... 250/231.13 |

FOREIGN PATENT DOCUMENTS

| DE | 40 22 837 A1 | 1/1992 |
| DE | 195 00 817 C1 | 2/1996 |
| DE | 197 58 104 A1 | 7/1999 |
| EP | 01 16 636 | 8/1984 |
| EP | 09 91 918 | 4/2000 |
| JP | 2005030776 | 2/2005 |

\* cited by examiner

*Primary Examiner*—Brian Young
(74) *Attorney, Agent, or Firm*—Brooks Kushman P.C.

(57) ABSTRACT

A method for determining the absolute value of a rotational angle includes imaging a continuous segment of a code track of a code carrier on a sensor array such that the sensor array generates a corresponding output signal. The code track has a light and dark transition pattern over an angular range of 360°. The sensor array output signal is subjected to a convolution operation with a reference signal in a first correlation filter to reconstruct the light and dark transition pattern of the imaged segment of the code track as a first correlation function signal. The first correlation function signal is processed to determine a code word and a predetermined angle corresponding to the code word.

10 Claims, 1 Drawing Sheet

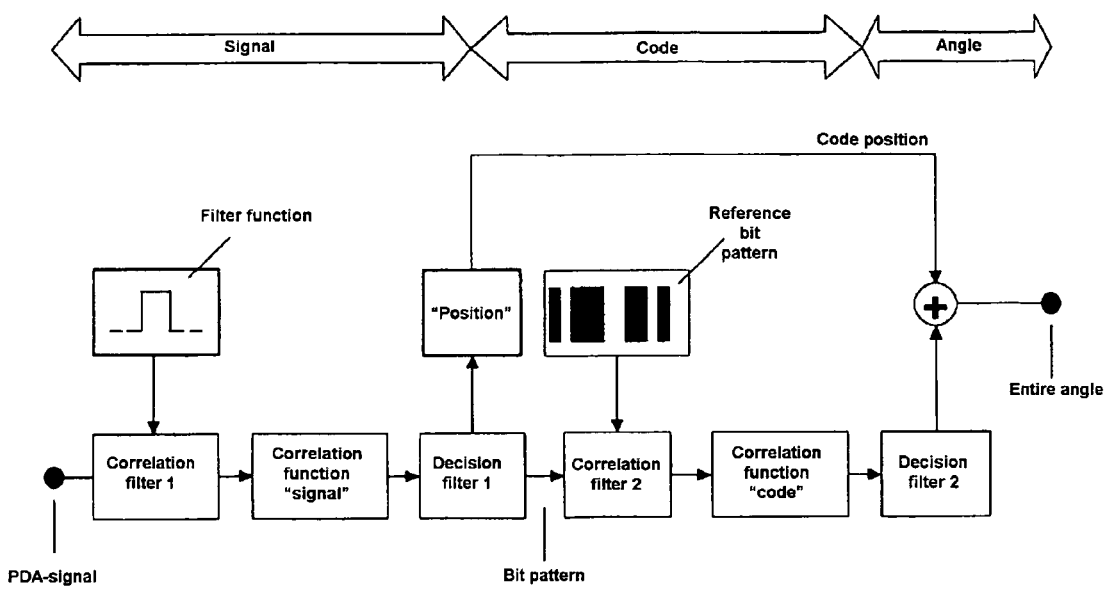

PROCESS TO DETERMINE THE ABSOLUTE ANGULAR POSITION OF A MOTOR VEHICLE STEERING WHEEL

CROSS-REFERENCE TO RELATED APPLICATIONS

This application priority to DE 10 2005 032 870.9, filed Jul. 14, 2005 in Germany, which is hereby incorporated by reference in its entirety.

BACKGROUND OF THE INVENTION

1. Field of the Invention

The invention relates to a process for determining the absolute value of a rotational angle, in particular the angular position of a motor vehicle steering wheel, by means of a transceiver including a light source and a sensor array having a multiplicity of optoelectronic transducers, and a code carrier arranged so that it can rotate with respect to the transceiver, the code carrier having a unique, single-track encoding of the angular values, a continuous segment of the encoding being imaged on the sensor array, and the output signal of the sensor array being evaluated to determine a code word corresponding to the current angular value.

2. Background Art

The absolute angular position of the steering wheel, also called the steering angle, is needed in motor vehicles so that this value can be supplied to a vehicle movement dynamics control system, for example. In addition to the mentioned steering angle value, such a vehicle movement dynamics control system receives other measurement data, such as the wheel speed or the rotation of the motor vehicle about its vertical axis. First the absolute steering angle and second the steering speed are needed so that these values, along with the other captured data, can be evaluated by the vehicle movement dynamics control system and converted to control actuators, for example the brakes and/or the engine management system.

DE 40 22 837 A1 discloses an optoelectronic steering angle sensor that is suitable to accomplish such a process. The steering angle sensor described in this document comprises an electronic control unit and a sensor unit consisting of two elements that are arranged so that they are parallel to one another and at a distance from one another—a light source and a line sensor—and, arranged between the light source and the line sensor, an encoder disk, which is connected with the steering shaft in a torsionally rigid manner. The line sensor provided is a CCD (charge-coupled device) sensor. The encoding provided in this encoder disk is a light slit extending over 360° in the shape of a spiral of Archimedes. The illumination of corresponding transducers of the line sensor at a certain steering angle makes it possible to derive information about the real steering angle position. The spiral of Archimedes used as the encoding is continuous, so that it can be spoken of as an analog encoding. However, using the same arrangement it is just as possible to read a digital encoding on the encoder disk.

DE 197 58 104 A1 (corresponding to U.S. Pat. No. 6,459, 389) discloses a process for determining the absolute value of a rotational angle. This previously known process involves evaluating sharp signal changes, generally referred to as edges, in the sensor array's output signal to convert the signal into a contrast difference. A microcontroller decodes the contrast differences by comparing them with a black-and-white pattern representing the angle information.

Although in theory this previously known process is able to achieve the goal of determining the sought-after angular value, it is very sensitive to any kind of interference. For example, dirtying of the optical system can cast additional shadows, which also manifest themselves as edges in the electrical output signal, and thus cause additional contrast differences not corresponding to the encoding. Especially when used in an automobile, electromagnetic interference also occurs, which causes additional edges in the sensor array's output signal. However, since the evaluation process is based precisely on identifying and evaluating such edges, or rather the contrast differences derived the from them, such spurious pulses cause corresponding measurement errors. Although such measurement errors can be recognized by means of appropriate procedures for plausibility checking of the measurement results derived from them, correction of these measurement results is impossible.

SUMMARY OF THE INVENTION

Starting from the prior art which has been discussed, the invention therefore has the goal of further developing a process of the type mentioned at the beginning so as to achieve clearly increased immunity to outside influences, especially those caused by dirt or spurious electromagnetic pulses.

The process according to the invention achieves this goal by subjecting the sensor array's output signal to a convolution operation with a reference signal in a first correlation filter, to reconstruct the imaged segment of the code track.

It is advantageous for the reference signal to represent a short segment from an idealized code signal.

The evaluation is made especially certain by the fact that in the correlation filter the sensor array's output signal and the reference signal are formed into a correlation function whose extremes reproduce the position of the code signal's light/ dark transitions. These extremes of the correlation function are then compared, in a first decision filter, with established correlation threshold values, and only if they fall above or below the corresponding correlation threshold values will the code signal be found to have a light/dark transition.

The imaged code track segment determined in this way is converted into a bit pattern representing it, and then the current code word is determined as the position where this bit pattern best coincides with a reference bit pattern representing the entire angle information of the code track; this is done by subjecting these two bit patterns to a convolution operation in a second correlation filter.

It is especially preferred for the result of this convolution operation to form a correlation function whose absolute maximum indicates the position where the bit pattern best coincides with the reference bit pattern.

A further improvement in certainty is achieved in a second decision filter by comparing the absolute maximum of the correlation function with an established correlation threshold value, and only if the maximum value of the correlation function exceeds the correlation threshold value is the angular value marked as valid.

BRIEF DESCRIPTION OF THE DRAWINGS

Further advantages and embodiments of the invention and the following description of a sample embodiment, make reference to the attached single FIGURE showing a block diagram of the operational sequence of the process.

DETAILED DESCRIPTION OF THE PREFERRED EMBODIMENTS

This sample embodiment starts from an angular position sensor arrangement in which a code carrier having a code track representing a digital encoding of the angular values is mounted so that it can rotate with respect to an optoelectronic transceiver. The code track represents a unique encoding of the angular values from 0° to 360°, and the transceiver's receiver is formed by a line sensor formed by a multiplicity of photodiodes, a so-called photodiode array (PDA). This example uses a PDA that has 128 individual photodiodes, also called pixels. This PDA is illuminated by the light transmitter associated with it, for example a light-emitting diode (LED), the transmitted light passing through the code carrier containing the encoding. The encoding is made, e.g., by a sequence of light-transmitting openings in the code carrier, which consists of an opaque material. If the illumination passes through this encoding in a radial direction, the encoding is realized as a track running around the outside of the cylindrical lateral surface of a corresponding code carrier, and if the illumination passes through it in the axial direction, it is realized as an annular track with a constant average radius on an encoder disk.

Illumination through this encoding will image, on the PDA, a light distribution representing the corresponding angular position. Depending on the desired resolution of the angular encoding and the other geometric relationships, the result is a minimal line width of the image of the encoding on the PDA. Thus, here the shortest distance between two light/dark transitions of the light distribution on the PDA should be described, which, in the sample embodiment in question, corresponds to an angular distance of one degree on the code carrier, that is a length of approximately 10 pixels on the PDA.

The output signal of the PDA caused by the light distribution forms the starting point of this process, in which this output signal is used to determine the underlying angle information.

To accomplish this, the PDA signal, which can also include various types of interference in addition to the desired information, is convoluted in a first correlation filter KF1 with a filter function RSK, which makes it possible to reconstruct, from the PDA signal, the light/dark pattern, i.e., the imaged encoding segment, and moreover to determine its geometric position relative to the PDA. The filter function RSK used to accomplish this is a reference signal curve, which represents a relatively short segment of a possible code sequence. The selected segment is clearly shorter than the entire code sequence over 360°, however longer than the already mentioned minimal line width of the code track. This can, for example, be a step function, the width of the step corresponding to the minimal line width, or a jump function, which, given an appropriate minimal line width, has the signal jump corresponding to a light/dark transition approximately in the middle.

The result of this filtering is a first correlation function "signal", whose pronounced extrema contain the information about the sequence of light/dark transitions and about their position in relation to the PDA. In order to be able to exclude possible interference, thresholds are defined for the correlation function "signal" to allow positive identification of the transitions. In a first decision filter EF1, these thresholds are used as a basis for deciding whether minima or maxima of the curve which do not exceed or fall below the thresholds also should not be evaluated as light/dark transitions. The position of the determined light/dark transitions with respect to the PDA is stored in a "position" memory and used for later correction of the determined angular value.

The information obtained in the described manner about the encoding segment imaged on the PDA can be converted into a bit pattern that represents it. In doing so, use is made of the fact that the minimal line width of the code track in pixels is approximately known, so that conversion into a bit pattern in which each bit corresponds to this minimal line width is simple. However, as an alternative to this it is also possible to determine the real minimal line width of the image on the PDA, and to perform the further evaluation with this determined size. This additional process branch is the object of an advantageous further development of the process according to the invention, and is explained following the presentation of the basic function.

In a further step of this basic function, the bit pattern obtained as previously described is convoluted in a second correlation filter KF2 with a reference bit pattern RBP representing the entire encoding over 360°, to produce a second correlation function "code". Now this second correlation function "code" contains the information about where the code segment imaged on the PDA is located with respect to the entire encoding. At the place in question, the correlation function "code" has a pronounced maximum. Here it is also possible once again to establish a correlation threshold to avoid interference, that is to make a statement about the reliability of the angular value that is obtained. Therefore, in a second decision filter EF2 it is determined whether the maximum of the correlation function "code" exceeds this threshold and, accordingly, characterizes the result value.

The determined code value reproduces the position of the code track with a resolution that corresponds to the minimal line width of the encoding on the code carrier, that is one degree in the selected example. However, in addition to information about the imaged code segment, the position of this segment with respect to the PDA is also known, and it is known with pixel or even subpixel precision. This information has previously been stored in the "position" memory and is now available, so that the determined angular code value can, with the help of this information, be corrected once again and calculated into the total angular value with a resolution of approximately a tenth of a degree.

Another improvement in precision can be achieved by the additional process branch that was already discussed, which is used to determine the real minimal line width of the image on the PDA. The reason is that real minimal line width of the image on the PDA is affected not only by the established structure of the code track on the code carrier, but rather also by the geometry of the entire optical light path. For example, not only can the manufacturing tolerances of the code carrier have an effect on this line width, but especially radial and axial tolerances of the mounting of the code carrier, and this effect can be at least slightly different from one angular position to another.

The starting point for this process branch is provided by the known positions of the light/dark transitions on the PDA. Because of the type of encoding, each distance between each two consecutive light/dark transitions must correspond exactly to an integral multiple of the minimal line width of the image on the PDA. A linear regression, which involves plotting the known positions against a grid of fixed distances, can be used to determine the real line width which best reproduces the real relationships in this situation. In addition to the slope of the fitted lines with the minimum standard error, which provides a measure of this real line width, the axis segment of these lines reproduces the geometric position of the code in relation to the PDA, and does this with subpixel precision.

What is claimed is:

1. A method for determining the absolute value of a rotational angle, the method comprising:

imaging a continuous segment of a code track of a code carrier on a sensor array such that the sensor array generates a corresponding output signal, wherein the code track has a light and dark transition pattern over an angular range of 360°;

subjecting the sensor array output signal to a convolution operation with a reference signal in a first correlation filter to reconstruct the light and dark transition pattern of the imaged segment of the code track as a first correlation function signal, wherein the reference signal represents a segment of the light and dark transition pattern of the code track, wherein extrema of the first correlation function signal are indicative of the light and dark transition pattern of the imaged segment of the code track and are indicative of the position of the light and dark transition pattern of the imaged segment of the code track relative to the sensor array; and processing the first correlation function signal to determine a code word and a predetermined angle corresponding to the code word.

2. The method of claim 1 wherein processing the first correlation function signal to determine a code word and a predetermined angle corresponding to the code word comprises:

comparing the extrema of the first correlation function signal in a first decision filter with maximum and minimum correlation threshold values; and determining each extreme of the first correlation function signal as being indicative of a light and dark transition of the light and dark transition pattern of the imaged segment of the code track if the extreme is greater than the maximum correlation threshold value or is less than the minimum correlation threshold value.

3. The method of claim 2 wherein processing the first correlation function signal to determine a code word and a predetermined angle corresponding to the code word further comprises:

converting the first correlation function signal into a bit pattern.

4. The method of claim 3 wherein processing the first correlation function signal to determine a code word and a predetermined angle corresponding to the code word further comprises:

subjecting the bit pattern of the first correlation function signal to a convolution operation with a reference bit pattern, wherein the reference bit pattern represents the light and dark transition pattern of the code track over the angular range of 360°; and determining the code word as a function of the position where the bit pattern of the first correlation function signal best coincides with the reference bit pattern.

5. The method of claim 4 wherein processing the first correlation function signal to determine a code word and a predetermined angle corresponding to the code word further comprises:

comparing the absolute maximum extrema of the first correlation function signal with a predetermined correlation threshold value; and marking the predetermined angle corresponding to the code word as valid if the absolute maximum extrema of the first correlation function signal is greater than the predetermined correlation threshold value.

6. A method comprising:

imaging a continuous segment of a code track on a sensor such that the sensor generates a corresponding output signal, wherein the code track has a light and dark transition pattern over an angular range of 360°;

subjecting the sensor output signal to a convolution operation with a reference signal in a first correlation filter to reconstruct the light and dark transition pattern of the imaged segment of the code track as a first correlation function signal, wherein the reference signal represents a segment of the light and dark transition pattern of the code track, wherein extrema of the first correlation function signal are indicative of the light and dark transition pattern of the imaged segment of the code track and the position of the light and dark transition pattern of the imaged segment of the code track relative to the sensor; and processing the first correlation function signal to determine a code word and a predetermined angle corresponding to the code word.

7. The method of claim 6 wherein processing the first correlation function signal comprises:

comparing the extrema of the first correlation function signal in a first decision filter with maximum and minimum correlation threshold values; and determining each extreme of the first correlation function signal as being indicative of a light and dark transition of the light and dark transition pattern of the imaged segment of the code track if the extreme is greater than the maximum correlation threshold value or is less than the minimum correlation threshold value.

8. The method of claim 7 wherein processing the first correlation function signal further comprises:

converting the first correlation function signal into a bit pattern.

9. The method of claim 8 wherein processing the first correlation function signal further comprises:

subjecting the bit pattern of the first correlation function signal to a convolution operation with a reference bit pattern, wherein the reference bit pattern represents the light and dark transition pattern of the code track over the angular range of 360°; and determining the code word as a function of the position where the bit pattern of the first correlation function signal best coincides with the reference bit pattern.

10. The method of claim 9 wherein processing the first correlation function signal further comprises:

comparing the absolute maximum extrema of the first correlation function signal with a predetermined correlation threshold value; and marking the predetermined angle corresponding to the code word as valid if the absolute maximum extrema of the first correlation function signal is greater than the predetermined correlation threshold value.

* * * * *